(12) United States Patent
Cleverley

(10) Patent No.: US 10,861,064 B2
(45) Date of Patent: Dec. 8, 2020

(54) METHOD AND SYSTEM FOR GENERATING CONTRADICTION SCORES FOR PETROLEUM GEOSCIENCE ENTITIES WITHIN TEXT USING ASSOCIATIVE TOPIC SENTIMENT ANALYSIS

(71) Applicant: ExxonMobil Upstream Research Company, Spring, TX (US)

(72) Inventor: Paul Hugh Cleverley, Wallingford (GB)

(73) Assignee: ExxonMobil Upstream Research Company, Spring, TX (US)

(*) Notice: Subject to any disclaimer, the term of this patent is extended or adjusted under 35 U.S.C. 154(b) by 267 days.

(21) Appl. No.: 16/005,712

(22) Filed: Jun. 12, 2018

(65) Prior Publication Data
US 2019/0378179 A1  Dec. 12, 2019

(51) Int. Cl.
*G06N 20/00* (2019.01)
*G06Q 30/02* (2012.01)
*G06Q 50/00* (2012.01)

(52) U.S. Cl.
CPC ......... *G06Q 30/0282* (2013.01); *G06N 20/00* (2019.01); *G06Q 50/01* (2013.01)

(58) Field of Classification Search
None
See application file for complete search history.

(56) References Cited

U.S. PATENT DOCUMENTS

| | | | |
|---|---|---|---|
| 8,356,030 B2 | 1/2013 | Neylon et al. | |
| 8,676,721 B2 | 3/2014 | Piovesan et al. | |
| 8,725,494 B2 | 5/2014 | O'Neil | |
| 9,015,098 B1 | 4/2015 | Crosley | |
| 9,619,571 B2 | 4/2017 | Lightner et al. | |
| 9,690,772 B2 | 6/2017 | Brun et al. | |
| 9,715,662 B2 | 7/2017 | Carmeli et al. | |
| 9,846,901 B2 * | 12/2017 | Boston | G06F 16/367 |
| 2013/0290232 A1 * | 10/2013 | Tsytsarau | G06N 20/00 706/46 |

OTHER PUBLICATIONS

Article title "Mining and Summarizing Customer Reviews" by Hu et al. published in Aug. 2004.*

(Continued)

*Primary Examiner* — Blake A Tankersley
(74) *Attorney, Agent, or Firm* — ExxonMobil Upstream Research Company—Law Department

(57) ABSTRACT

The invention is a data processing method and system for notifying petroleum geoscientists of contradictions in sentiment between petroleum geoscience topic associations in text. The data processing system makes the necessary calculations to detect petroleum geoscience associations of interest, predict their sentiment and report contradictions in sentiment. Contradictions can be calibrated with past business success and failures through time, such as exploration or operations, to create a classifier to predict future areas of opportunity and risk. In particular, the data processing system operates on any digital unstructured text derived from academic literature, company reports, web pages and other sources. This information is analyzed and utilized by the system assisting petroleum geoscientists to identify business opportunities and risks.

14 Claims, 14 Drawing Sheets

Figure 2:
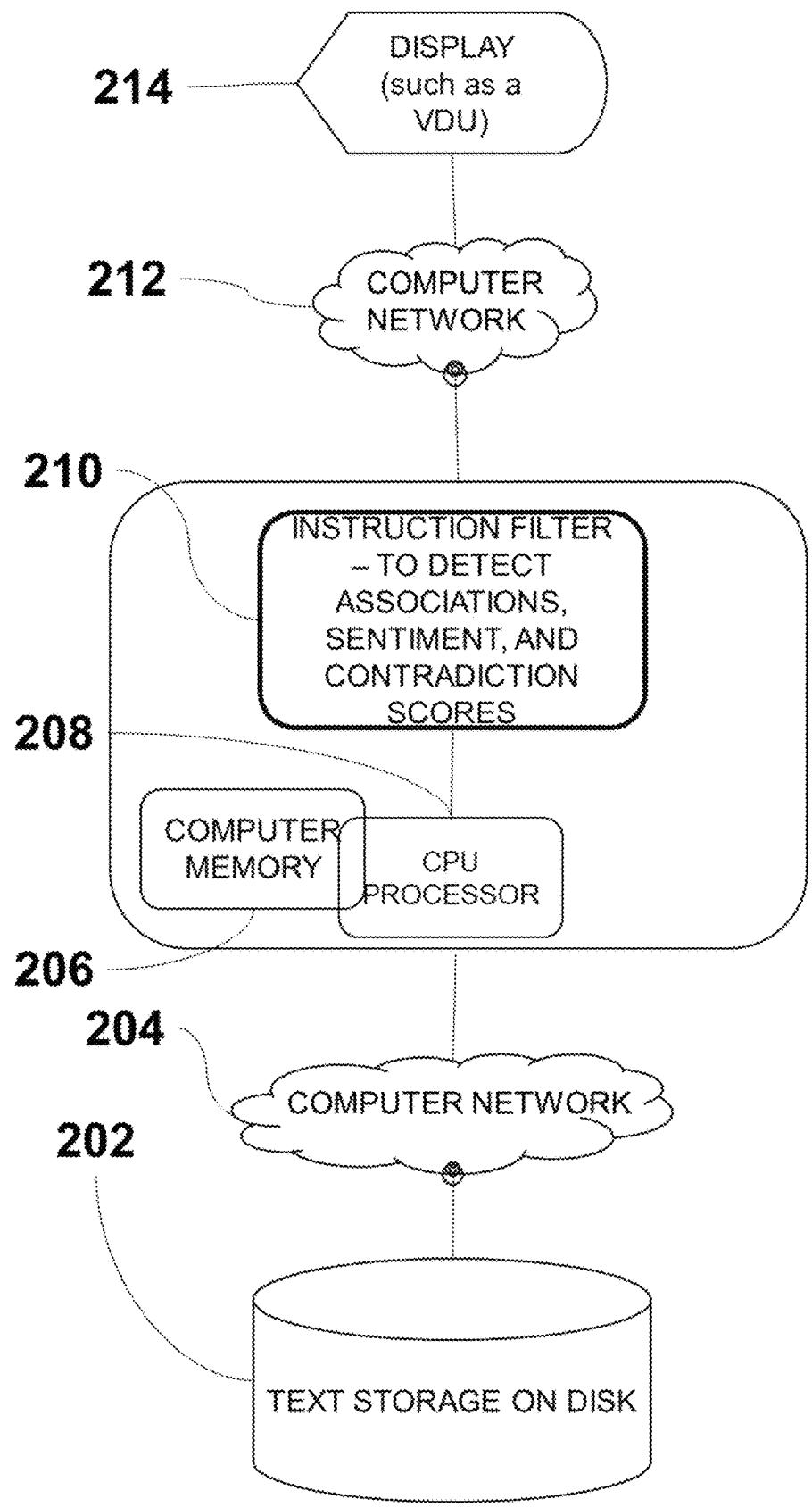

Sentiment and Contradiction methods applied to a sample sentence of text

(56) References Cited

OTHER PUBLICATIONS

Aldahawi, H.A. and Allen, S.M. (2013) "*Twitter Mining in the Oil Business: A Sentiment Analysis Approach*", Third International Conference on Cloud and Green Computing (CGC), Sep. 30-Oct. 2, Karlsruhe, Germany. IEEE, pp. 581-586.

Blei, D. M. et al. (2003) "*Latent Dirichlet Allocation*", Journal of Machine Learning Research, 3, pp. 993-1022.

Bloom, Benjamin S. et al. (1956) "*Taxonomy of educational objectives, handbook I: The cognitive domain*", New York: David McKay Co. Inc., pp. 1-24; 62-77; 89-98; and 144-148.

Cleverley, P.N. and Burnett, S. (2014) "*Facilitating Serendipity: the Role of Multi-query Text Co-occurrence Facets in Enterprise Search and Digital Library Results*", Proceedings of the 5$^{th}$ International Symposium on Information Management in the Changing World, Nov. 24-26 Antalya, Turkey. http://ickm2014.bilgiyonetimi.net/pressentations/, 25 pgs.

Cleverley, P.N. (2017) "*Applying Text and Data Mining to Geological Articles: Towards Cognitive Computing Assistants*", Geological Society of America Annual Technical Conference, Oct. 22-26, 2017, Seattle, WA, USA, Abstract, 1pg.

Cleverley, P.N. (2018) "*Mining Geological Sentiment from Unstructured Text*", Big Data in the Geosciences, Geological Society of London, Feb. 27-Mar. 1, 2018, Burlington House, London, UK, pp. 39-40.

ECIM and CDA (2016) "*Proceedings of the Digital Dividends from Subsurface Data: Data Science Meets the Unstructured Data Challenge Workshop*", Online Article (http://cdal.com/wp-content/uploads/2016/12/CDA-ECIM-DM-Workshop-Unstructured-Data-Challenge-November-2016-Proceedings.pdf, accessed Jan. 2018), 24 pgs.

Fink, A. (2014) "*Conducting Research Literature Reviews: From the Internet to Paper*", Fourth edition. Thousand Oaks, CA: SAGE, Chapter 10, pp. 1-37.

Grimes, S. (2012) "*From Sentiment Analysis to Enterprise Applications*", Greenbook Online Article (http://www.greenbookblog.org/2012/01/02/from-sentiment-analysis-to-enterprise-applications/, accessed Jan. 2018), 11 pgs.

He, W. et al. (2017) "*Managing extracted knowledge from big social media data for business decision making*", Journal of Knowledge Management, 21(2), pp. 275-294.

Hoffiman, J. et al. (2017) "*Sequence Mining and Pattern Analysis in Drilling Reports with Deep Natural Language Processing*", Cornell University Library Online Article (https://arxiv.org/abs/1712.01476, accessed Mar. 2018), Dec. 5, 2017, 7 pgs.

Li, L. et al. (2017) "*Contradiction Detection with Contradiction-Specific Word Embedding*", Algorithms 2017, 10(2). www.mdpi.com/1999-4893/10/2/59/htm.

Liu, B., Zhang, L. (2012) "*A Survey of Opinion Mining and Sentiment Analysis*", In: Aggarwal, C., Zhai, C. (eds) Mining Text Data, Springer, Boston, MA, pp. 415-463.

Manning, C.D. et al. (2008) "Introduction to Information Retrieval", Cambridge University Press, pp. 61-77; 100-123; 218-320; and 369-384.

Mantyla, M.V. and Kuutila, M. (2018) "*The evolution of sentiment analysis—A review of research topics, venues and top cited papers*", Computer Science Review, 27, pp. 16-32.

Pang, B. and Lee, L. (2008) "*Opinion Mining and Sentiment Analysis*", Foundations and Trends in Information Retrieval, 2(1/2), pp. 1-100.

Rose, P.R. (2016) "*Cognitive Bias, The Elephant in the Living Room of Science and Professionalism*", American Association of Petroleum Geologists (AAPG) Distinguished Lecture Tour, 2 pgs. http://www.aapg.org/career/training/in-person/distinguished-lecturer/abstract/articleid/23068/cognitive-bias-the-elephant-in-the-living-room-of-science-and-professionalism.

Schouten, K. and Frasincar, F. (2016) "*Survey on Aspect-Level Sentiment Analysis*", IEEE Transactions on Knowledge and Data Engineering, 28(3), pp. 813-830.

Sidahmed, C. J. et al. (2015) "*Augmenting operations monitoring by mining unstructured drilling reports*", SPE Digital Energy Conference and Exhibition, Mar. 3-5, 2015, The Woodlands, Texas, USA. SPE Report No. SPE-173429-MS, 13 pgs.

Taboada, Maite (2015) "*Sentiment Analysis: An Overview from Linguistics*", Annual Review of Linguistics, 2: pp. 325-347.

Tong et al. (2015) "*Production Estimation for Shale Wells with Sentiment-Based Features for Geology Reports*", IEEE International Conference on Data Mining Workshop (ICDMW), Nov. 14-17, Atlantic City, NJ, USA, pp. 1310-1318.

Tsytsarau, M. and Palpanas, T. (2016) "*Managing Diverse Sentiments at Large Scale*", IEEE Transactions on Knowledge and Engineering, 28(11), pp. 3028-3040.

Van Boeyen, Scott (2014) "*Why Sentiment analysis engines need customization*", Online Article (http://www.techradar.com/news/software/business-software/why-sentiment-analysis-engines-need-customization-1256701, accessed Feb. 2018), 4 pgs.

\* cited by examiner

| FLOWCHART NUMBER | EXAMPLE – OUTPUT FROM PROCESS |
|---|---|
| Prepare text (1) | Northern Spain has few source rocks, although according to Smith (2015) the Jurassic saw Black Shales in abundance, there was also some evidence for unsorted reservoirs of Sandstone in the Erin Formation. — 102 |
| (2) Detect Topics | Northern Spain has few source rocks, although according to Smith (2015) the Jurassic saw black shales in abundance, there was also some potential for unsorted reservoirs of Sandstone in the Erin Formation. — 106<br>104 |
| (3) Compute Associations | 108 — (Northern Spain, Jurassic, Source Rock)<br>(Northern Spain, Erin Formation, Reservoir) |
| (4) Compute Windows & Topic Association(s) Sentiment | 110 — according to Smith (2015) the Jurassic saw Black Shales in abundance — Positive (+) — 112<br>potential for unsorted reservoirs of Sandstone in the Erin Formation.<br>114 — Negative (-)<br>(Northern Spain, Jurassic, Source Rock, +1) — 116<br>(Northern Spain, Erin Formation, Reservoir, -1) |
| (5) Compute Contradiction Score | In simulating example below, 9 total instances for Assoc. #1 (7 positive, 2 negative) and 4 for Assoc. #2 (4 positive): — 118<br>Assoc. #1 – (Northern Spain, Jurassic, Source Rock) = {+1, +1, +1, +1, +1, +1, +1, -1, -1}<br>Assoc. #2 – (Northern Spain, Erin Formation, Reservoir) = {+1, +1, +1, +1}  Variance Score = 0.691<br>If all the positive (+) sentiment scores in Assoc. #1 came from different authors and all the (-) sentiment scores in Assoc. #1 came from the same author, entropy weighting functions can be applied. For example, the 2 negative (-) sentiment scores may collapse into 1 negative, giving a Contradiction Score of 0.437 (adjusted for author bias) — 120 |

FIG 1. Sentiment and Contradiction methods applied to a sample sentence of text

METHOD AND SYSTEM FOR GENERATING CONTRADICTION SCORES FOR PETROLEUM GEOSCIENCE ENTITIES WITHIN TEXT USING ASSOCIATIVE TOPIC SENTIMENT ANALYSIS

CROSS-REFERENCE TO RELATED APPLICATIONS

U.S. Patent Documents

U.S. Pat. No. 8,676,721 B2 (September 2009) Piovesan and Kozman
U.S. Pat. No. 8,356,030 B2 (January 2013) Neylon et al
U.S. Pat. No. 8,725,494 B2 (May 2014) O'Neil
U.S. Pat. No. 9,015,098 B1 (April 2015) Crosley
U.S. Pat. No. 9,619,571 B2 (April 2017) Lightner
U.S. Pat. No. 9,690,772 B2 (June 2017) Brun et al
U.S. Pat. No. 9,715,662 B2 (July 2017) Carmeli et al Other Publications Aldahawi, H. A. and Allen S. M. (2013). Twitter Mining in the Oil Business: A Sentiment Analysis Approach. *Third International Conference on Cloud and Green Computing (CGC)*, September 30-October 2, Karlsruhe, Germany. IEEE.

Blei, D. M. et al (2003). Latent Dirichlet Allocation. *Journal of Machine Learning Research*, 3, pp. 993-1022

Cleverley, P. H. and Burnett, S. (2014). Facilitating Serendipity: the Role of Multi-query Text Co-occurrence Facets in Enterprise Search and Digital Library Results. *Proceedings of the 5th International Symposium on Information Management in the Changing World*, November 24-26 Antalya, Turkey. http://ickm2014.bilgiyonetimi.net/presentations/

Cleverley, P. H. (2017). Applying Text and Data Mining to Geological Articles: Towards Cognitive Computing Assistants. *Geological Society of America Annual Technical Conference*, 22-26 Oct. 2017, Seattle, Wash., USA.

Cleverley, P. H. (2018). Mining Geological Sentiment from Unstructured Text. Big Data in the *Geosciences, Geological Society of London*, February 27-Mar. 1, 2018, Burlington House, London, UK.

ECIM and CDA (2016). Proceedings of the Digital Dividends from Subsurface Data: Data Science Meets the Unstructured Data Challenge Workshop. Online Article (http://cdal.corniwp-content/uploads/2016/121CDA-ECIM-DM-Workshop-Unstructured-Data-Challenge-November-2016-Proceedings.pdf, accessed January 2018).

Fink, A. (2014). Conducting Research Literature Reviews: From the Internet to Paper. Fourth edition. Thousand Oaks, Calif.: SAGE Grimes, S. (2012). From Sentiment Analysis to Enterprise Applications. Greenbook Online Article (http://www.greenbookblog.org/2012/01/02/from-sentiment-analysis-to-enterprise-applications/, accessed January 2018).

He, W. et al. (2017). Managing extracted knowledge from big social media data for business decision making. *Journal of Knowledge Management*, 21(2): 275-294.

Hoffman, J. et al (2017). Sequence Mining and Pattern Analysis in Drilling Reports with Deep Natural Language Processing. Cornell University Library. Online Article (http://arxiv.org/abs1712.01476, accessed March 2018).

Li, L. et al (2017). Contradiction Detection with Contradiction-Specific Word Embedding. *Algorithms* 2017, 10(2). www.mdpi.com/1999-4893/10/2/59/htm Liu B., Zhang L. (2012) A Survey of Opinion Mining and Sentiment Analysis. In: Aggarwal C., Zhai C. (eds) *Mining Text Data*. Springer, Boston, Mass.

Manning, C. D. et al. (2008). *Introduction to Information Retrieval*. Cambridge University Press.

Bloom, Benjamin S. et al. 1956. *Taxonomy of educational objectives, handbook I: The cognitive domain*. New York: David McKay Co Inc.

Mantyla, M. V. and Kuutila, M. (2018). The evolution of sentiment analysis A review of research topics, venues and top cited papers. *Computer Science Review*, 27, pp. 16-32

Pang, B and Lee, L. (2008). Opinion Mining and Sentiment Analysis. *Foundations and Trends in Information Retrieval*, 2(1/2), pp. 1-135

Rose, P. R. (2016). Cognitive Bias, The Elephant in the Living Room of Science and Professionalism. American Association of Petroleum Geologists (AAPG) Distinguished Lecture Tour. http://wmw.aapg.org/career/training/in-person/distinquished-lecturer/abstract/articleid/23068/cognitive-bias-the-elephant-in-the-living-room-of-science-and-professionalism Sidahmed, C. J. et al (2015). Augmenting operations monitoring by mining unstructured drilling reports. *SPE Digital Energy Conference and Exhibition*, 3-5 Mar. 2015, The Woodlands, Tex., USA. SPE Report Number SPE-173429-MS Schouten, K. and Frasincar, F. (2016). Survey on Aspect-Level Sentiment Analysis. *IEEE Transactions on Knowledge and Data Engineering*, 28(3), pp. 813-830

Taboada, Maite 2015. Sentiment Analysis: An Overview from Linguistics. *Annual Review of Linguistics*, 2: 325-347.

Tong et al (2015). Production Estimation for Shale Wells with Sentiment-Based Features for Geology Reports. *IEEE International Conference on Data Mining Workshop (ICDMW)* 14-17 November, Atlantic City, N.J., USA.

Tsytsarau, M. and Palpanas, T. (2016). Managing Diverse Sentiments at Large Scale. *IEEE Transactions on Knowledge and Engineering*, 28(11), pp. 1041-4347

Van Boeyen, Scott 2014. Why Sentiment analysis engines need customization. Online Article (http://www.techradar.com/news/software/business-software/why-sentirnent-analysis-engines-need-customization-1256701, accessed February 2018).

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable

STATEMENT REGARDING PRIOR DISCLOSURES BY THE INVENTOR OR A JOINT INVENTOR

The method of applying sentiment analysis to topic association names in petroleum geoscience text has not been disclosed (outside this United States Patent application) in sufficient detail in order to recreate the method. A conference presentation in February 2018 at the Geological Society of London (Cleverley 2018) did introduce the notion of petroleum geoscience sentiment. The method of generating contradictions from the sentiment of petroleum geoscience labelled topic associations and calibrating that with historical success and failures in order to create a predictive classifier has not been disclosed anywhere outside this United States Patent Application.

BACKGROUND OF THE INVENTION (1) Field of the Invention

The present invention relates generally to petroleum geoscience, more specifically to the field of sentiment analysis at the intersection of information retrieval, natural language processing and artificial intelligence.

(2) Description of Related Art

For scientists in academia and practice, one of the important aspects of a literature review is to identify contradictions within the body of literature (Fink 2014). These contradictions provide potentially fertile ground for new theory development and new business opportunities.

In the current data driven environment of 'big data'—exponentially growing information volumes in published literature and reports, it is not possible for scientists to read all that is relevant due to human cognitive processing limitations. Whilst most subject matter experts may know the 'big patterns' in their specialties, it is the 'small patterns' within and across the boundaries of these areas that may present the most unexpected, insightful and valuable information. There is also evidence of significant cognitive bias (Rose 2016), with petroleum geoscientists often overestimating and underestimating risks in areas of sparse data.

Text and data mining (TDM) is the use of automated analytical techniques to analyse text and data for patterns, trends and other useful information. These techniques can be used to summarize, synthesize and compare (Manning et al. 2008), supporting higher level thinking processes rather than simply retrieving (remembering) information (Bloom et al. 1956). One data driven TDM technique is sentiment (tone) analysis, concerned with identifying opinion in text such as its polarity (positive or negative) and the strength or intensity of that opinion (Pang and Lee 2008; Taboada 2015). In recent years sentiment analysis has evolved from analyzing online product reviews towards social media text, supporting its application into subject areas such as stock markets, elections, disasters, medicine, software engineering and cyberbullying (Mantyla and Kuutila 2018).

There appears a growing realization that exploiting unstructured text can lead to potential insights on the future that cannot be gleaned from traditional numerical data and indices stored in structured databases. This is important to the petroleum industry as in many areas the 'easy oil' has been found and there is a need to digitally transform, exploiting more data driven insights from non-traditional methods.

However, sentiment engines are likely to need customizations when applied to a specific domain area (Van Boeyen 2014). Generic lexicons (Neylon et al 2013) applied to domain content are likely to be suboptimal. For example, using an off-the-shelf commercial sentiment analysis tool, it was reported that the American Red Cross found that only 21% of domain positive comments were successfully detected by generic sentiment analysis methods embodied in computer software (Grimes 2012).

The same technical challenges exist in understanding sentiment in the petroleum geoscience domain. For example, the term 'expelled' which normally has negative tendencies in generic sentiment lexicons, has tendencies to be viewed positively by petroleum geoscientists in exploration for example, as it is an essential element of a working petroleum system.

Sentiment classification focuses on two main levels, what could be considered 'coarse grained' methods relating to the document and sentence, the 'information container' level, and 'finer grained' methods relating to named entities (or aspects of those entities) within those information containers.

The vast majority of sentiment analysis methods focus on general 'information containers', such as the sentiment of a 'document' or 'sentence' (He et al 2017). In these methods sentiment analysis is focused on the 'information container'. Technical challenges relate to 'smoothing', where individual signals of sentiment in the text pertaining to finer grained elements can be lost through the summing of scores, so cancel each other out or signals are masked by bigger patterns, so not always helpful for detecting contradictions.

Tracking topics in text which may only be occasionally explicitly mentioned, such as 'product quality', lends itself to latent Topic Modelling (Blei et al 2003) although the topics returned are unlabeled so can lack specificity to the work task in question and often require significant interpretation. In shorter more specific texts related to consumer and social media, topics are usually found as named entities and in narrow subject domains, lexicons and thesauri may exist (or be relatively easy to create by subject matter experts) in order to accurately model the variations by which the topics can be described.

O'Brien (2014) developed a method to compute sentiment at a finer grained level within an information container using named entities. Entity names (a named noun phrase that uniquely identifies something) may include those entities such as 'Meryl Streep' and Pierce Brosnan', with the method using the words around those entities to infer the sentiment about that entity. Sentiment analysis is focused on the named entity in this method. Analysis can also take place on named entity to named entity co-occurrence (Lightner et al 2017).

Methods to determine sentiment of aspects of entities have also been developed (Schouten and Frasincar 2016; Brun et al 2017). This method finds and aggregates sentiment on entities in documents or aspects of them for fine grained analysis. For example, for the sentence 'Giraldi's pizza was nice, but service was awful', the method splits the sentiment into (Giraldi's pizza>product, positive) and (Giraldi's pizza>service, negative). In this method sentiment analysis is still focused on the named entity (as with O'Neil's) but also covers immediate relations to that specific named entity. The technical challenge with this method is as with O'Neil's (2014), in that it does not cater for 'entities' which are not explicitly named, but only latently exist through associations of labelled topic names in text.

In the petroleum practitioner literature, analytics methods for unstructured text focus on Optical Character Recognition (OCR), classifying whole documents, summarizing documents, interpreting images in documents and extracting numerical data (ECIM and CDA 2016). Information container based unsupervised machine learning (Sidahmed 2015) and supervised machine learning on labeled sentences in drilling reports (Hoffman 2017) has also received attention. Application of any sentiment analysis techniques in the petroleum industry is rare. Aldahawi and Allen (2013) provide the first published example of applying sentiment analysis in the petroleum industry, using traditional 'information container' approaches to whole sentences in Twitter feeds of oil and gas companies. Cleverley and Burnett (2014) provided the first known evidence in petroleum geoscience that individual lexicon terms labelled as positive/negative sentiment terms within text may be useful as facets to filter search results. Geoscience sentiment has also been applied in petroleum production to semi-structured Information containers' (Tong et al 2015) and geological formation names as entities (Cleverley 2017).

Contradiction detection is a task to recognize contradiction relations between a pair of sentences (Li et al 2017). For real time social media, Tsytsarau and Palpanas (2016) used an entropy method to determine contradictions including data volumes. Using this method, with two classes of 'positive' and 'negative', the largest contradiction occurs when the classes are of equal size and largest in number. The technical challenge with that method is the preferential treatment of what is most statistically frequent, meaning small patterns (signals) may be masked by big patterns. Related to contradictions, Carmeli et al (2017) suggested a method to determine inconsistencies related to structured data in a database and unstructured text, which was less opinion related and more objective related.

BRIEF SUMMARY OF THE INVENTION

The present invention is a method and system for computing the fine grained sentiment of petroleum geoscience entities which only exist through their associations between topic names in text. The petroleum geoscience sentiment generated encompasses both subjective opinion and objective facts (determined from numerical data) present within sentences. The present invention computes a contradiction score from that resulting sentiment which places equal emphasis on small and large volumes of data given the same relative contradiction between sentiment classes. Entropy measures are used but only with respect to the number of unique authors from which the associations are derived. This contradiction information can be calibrated with real world petroleum exploration success and failures through time using machine learning, in order to create a predictive classifier of future business potential and risk.

For example, consider the text " . . . in this area an anoxic event occurred in the Eocene which led to rich black shale deposition . . . ". Eocene is a labelled classification related to an age range in geological time. Black shales are a label for a rock classification that can be potential petroleum source rocks. A 'source rock' is a classification label given to a rock which is capable of generating hydrocarbons. On their own, each topic name is quite generic within the petroleum geoscience domain, but mentioned in association together within text. they begin to define an entity which is never explicitly named in the text. By stacking different associations, it is possible to construct 'play' entities that are never explicitly named (so are not named entities).

It would therefore be desirable to have a data processing system and method to determine the sentiment of petroleum geoscience topic associations. It would be therefore be desirable to have a method and system to compute a contradiction score using sentiment of the associations of topics based on their variance and calibrating these contradictions to real world outcomes of success and failure through time.

This would be useful because there is too much potentially relevant information available for petroleum geoscientists to read, therefore identifying contradictions including small patterns within texts could provide a set of favorable areas for re-interpretation that may lead to new petroleum exploration opportunities or a re-assessment of risk, thereby mitigating cognitive bias.

Accordingly, in one aspect, a computer process as implemented, involves receiving sentences from a plurality of sentences and topic lexicons from a plurality of lexicons in a computer memory. These data in the computer memory are processed with a computer processor to compute further topics and associations of topics. A sentiment classification (positive, negative, neutral) for each association is computed using an appropriate method that takes into consideration the petroleum geoscience domain perspective. A preferred embodiment is a labelled dictionary (lexicon) and machine learning method. This is achieved by applying a filter to tokens nearby each topic association detected in a sentence, the contradiction score being a variance measure of the aggregated sentiment classification for that specific association with a weighting function to mitigate individual authors heavily biasing scores.

In another aspect, a computer program utilizes computer disk (storage) in which instruction code resides. These instructions when processed by a computer, instruct the computer to compute sentiment of topic associations, a contradiction score and a predictive classifier by learning from labelled examples of past events of petroleum successes and failures. The techniques could be implemented in digital circuitry, hardware, firmware or software. The techniques can be implemented in a computer program written in any form of programming language and on any operating system. Additional embodiments could include one or more computer devices configured to carry out the instructions.

BRIEF DESCRIPTION OF THE SEVERAL VIEWS OF THE DRAWING(S)

The figures attached form part of the specification, further explain the invention and supported by the detailed description, serve to explain the principles of the present invention.

FIG. 1 Example applied to a sentence of text.

FIG. 2 Diagram illustrating the system architecture.

Figure 3:
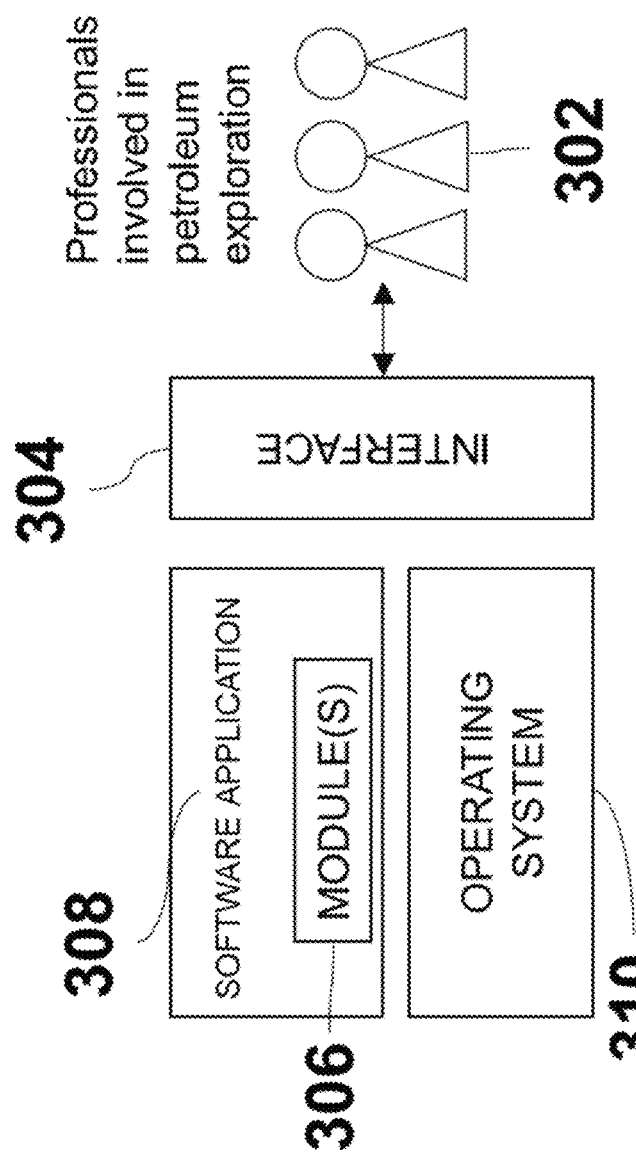

FIG. 3 Schematic illustrating the software system, modules, operating system and user interface.

Figure 4:
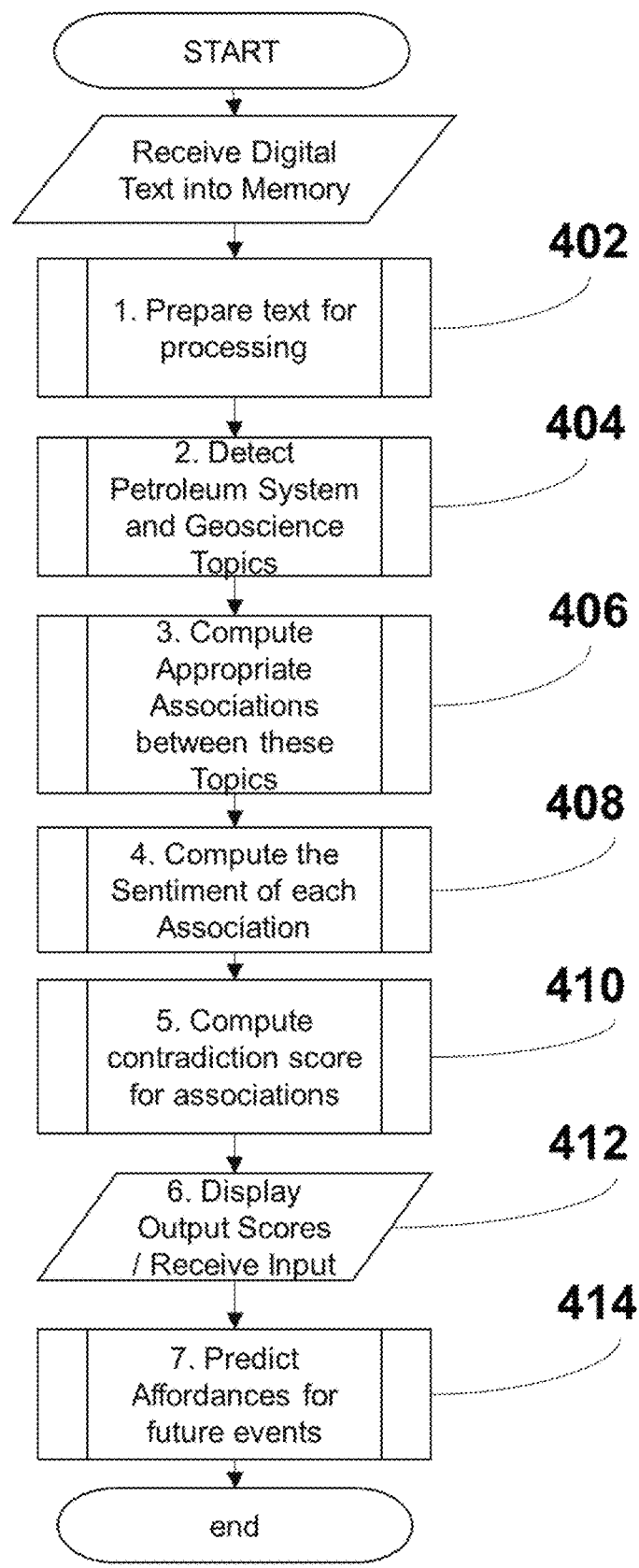

FIG. 4 High level flowchart of operations summarizing the computation of petroleum geoscience sentiment for topic associations and subsequent computation of a contradiction score, in accordance with a preferred embodiment.

Figure 5:
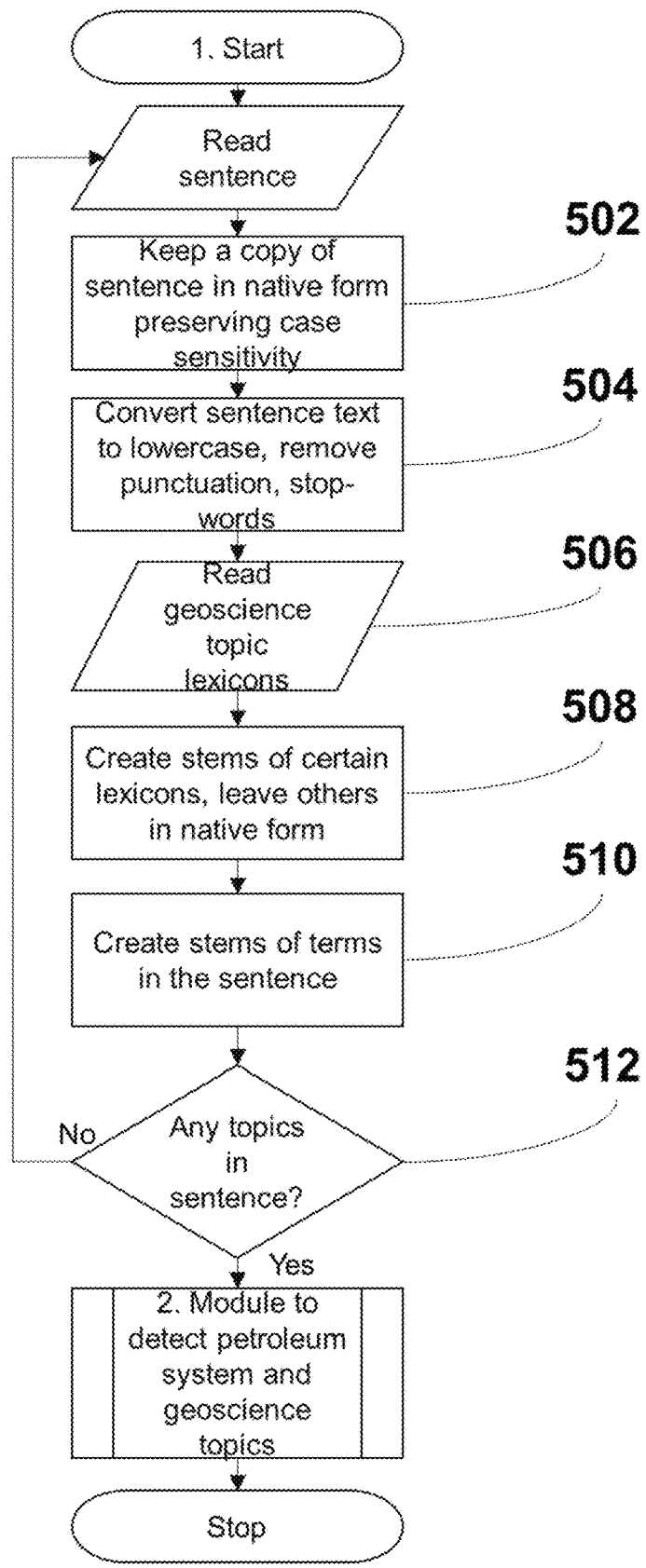

FIG. 5 Flow chart for preparing text for processing operations.

Figure 6A:
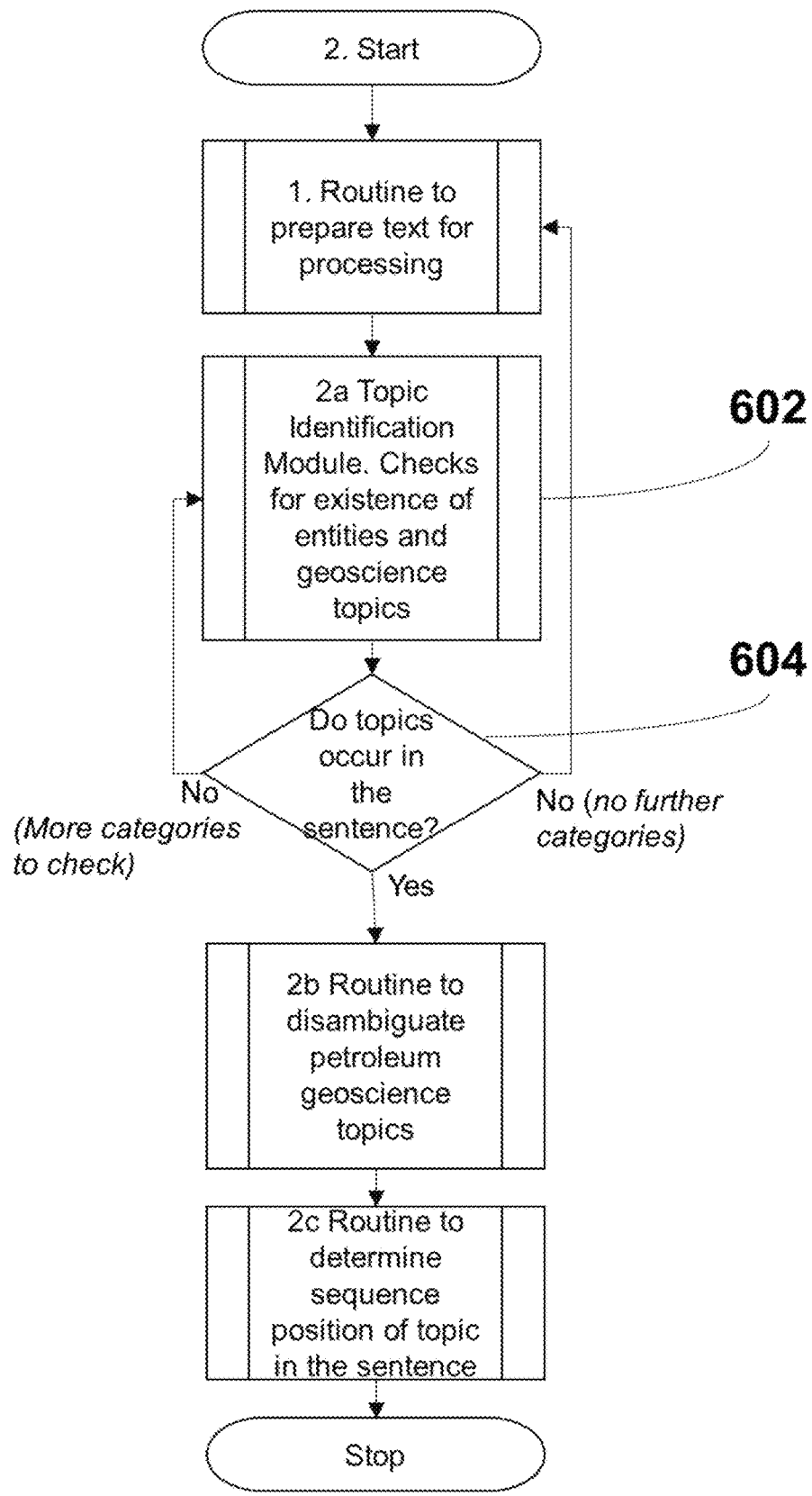

FIG. 6a—Flow chart for detecting petroleum geoscience topics Summary.

Figure 6B:
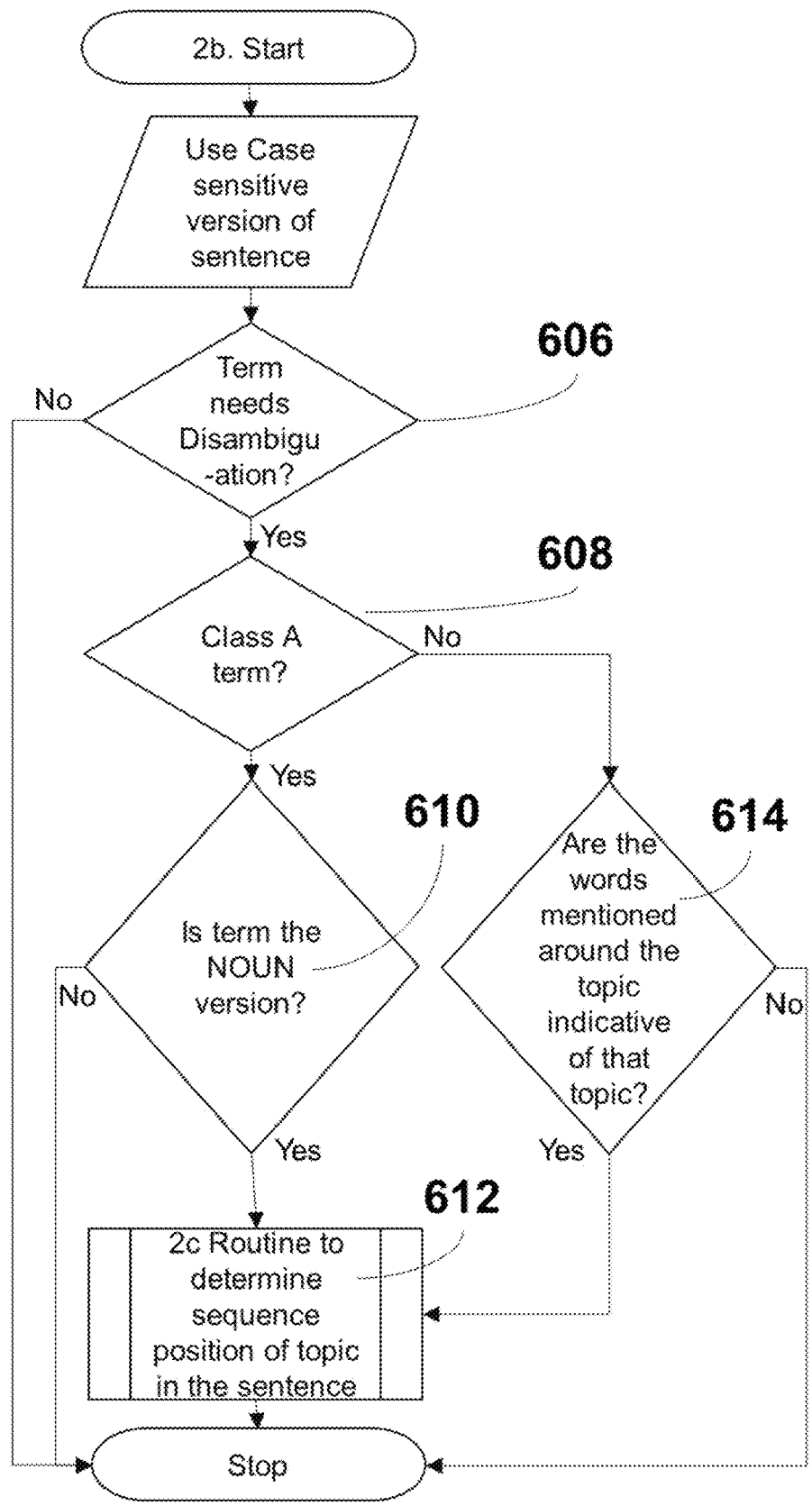

FIG. 6b Flow chart for detecting petroleum geoscience topics Disambiguation.

Figure 6C:
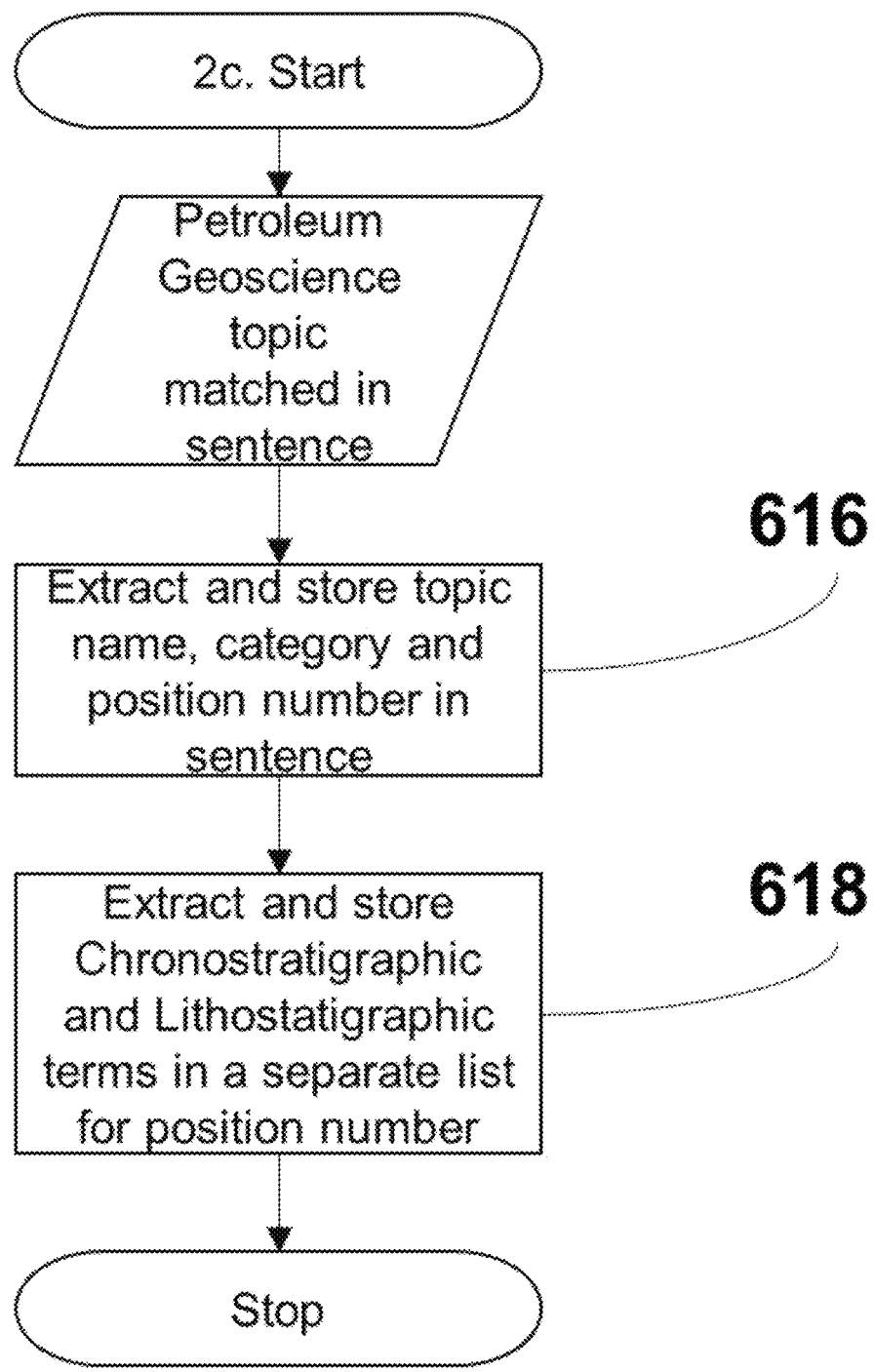

FIG. 6c Flow chart for detecting petroleum geoscience topics Position Location.

Figure 7:
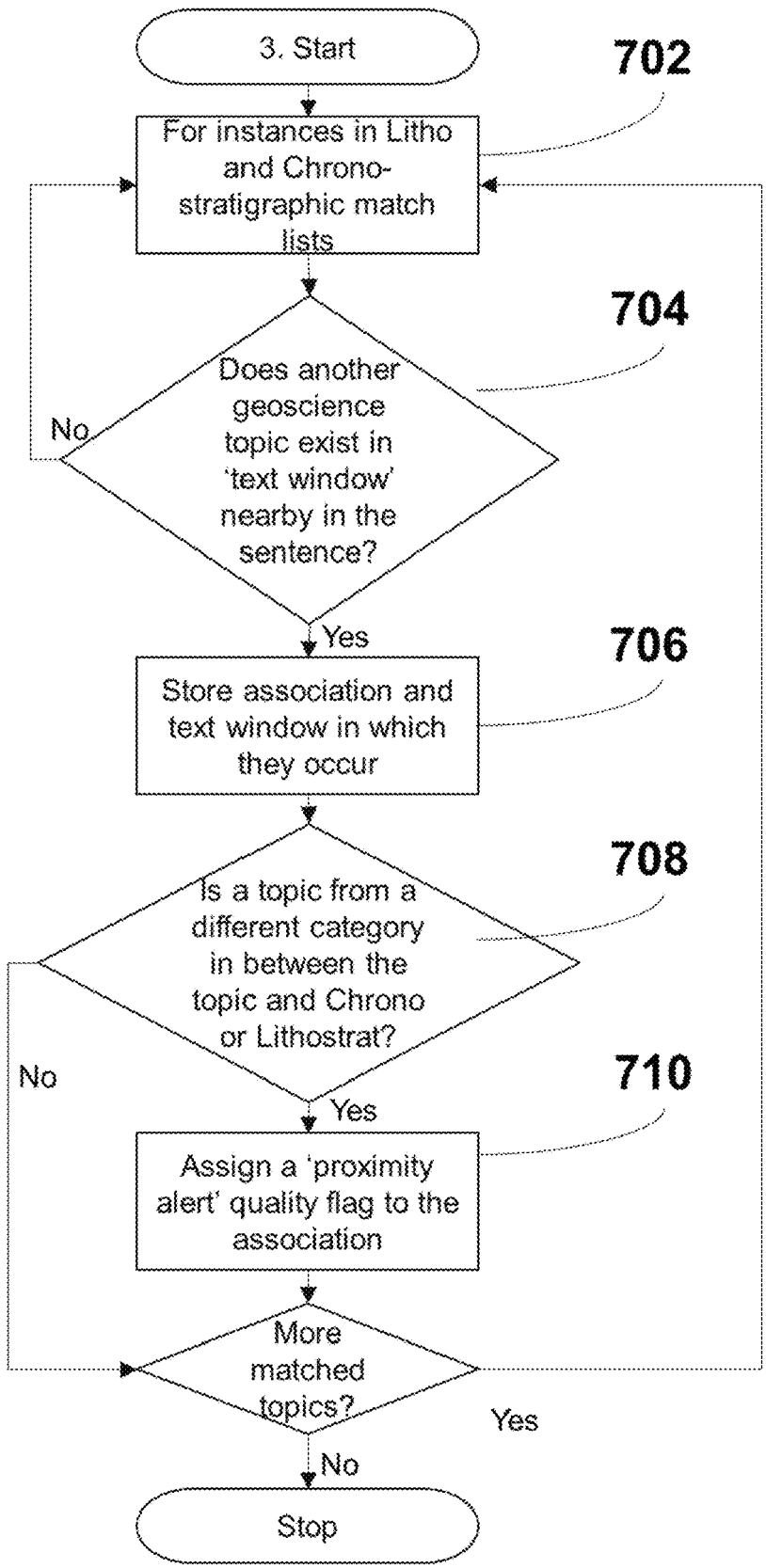

FIG. 7 Flow chart for detecting petroleum geoscience topic—Associations.

Figure 8:
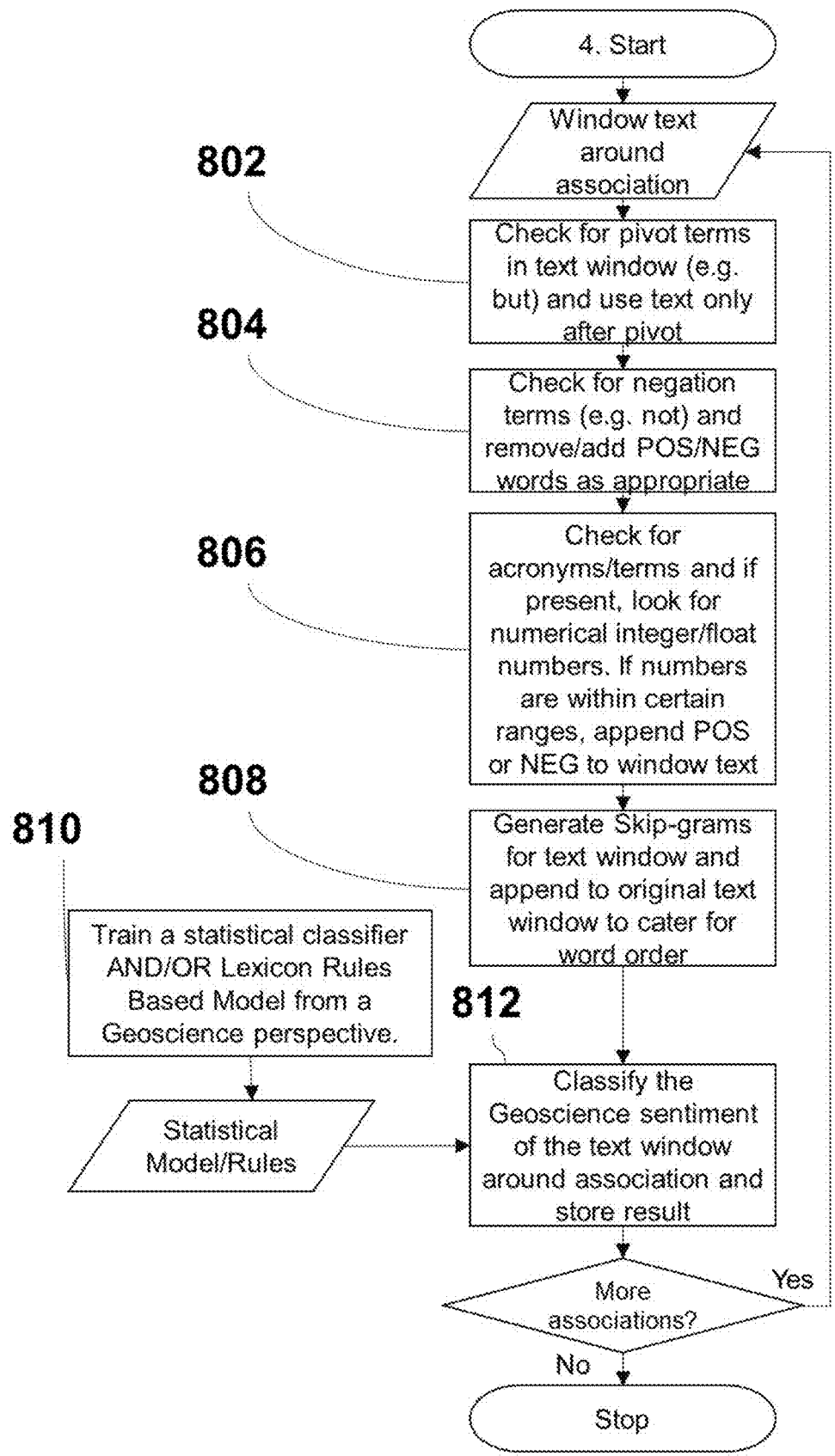

FIG. 8 Flow chart for computing sentiment of an association operations.

Figure 9:
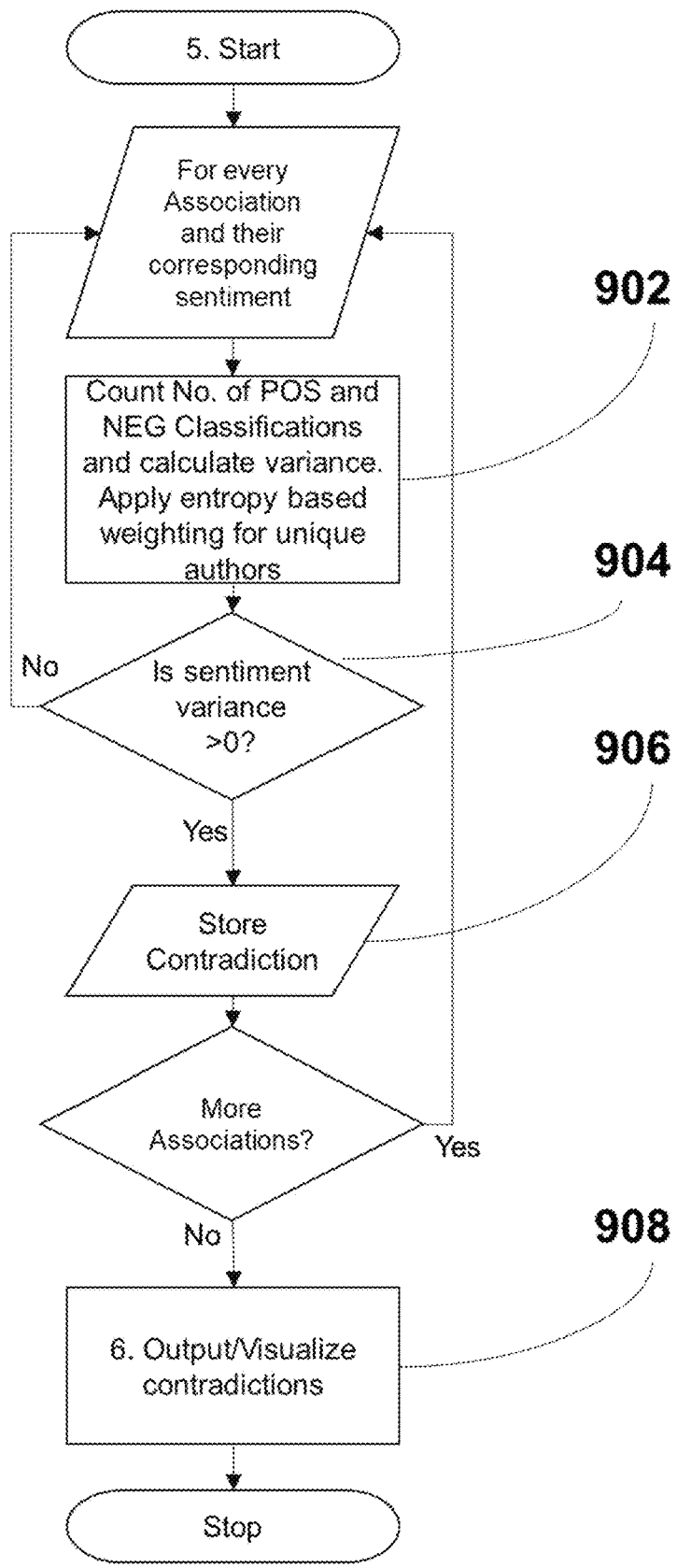

FIG. 9 Flow chart for computing contradiction score operations.

Figure 10A:
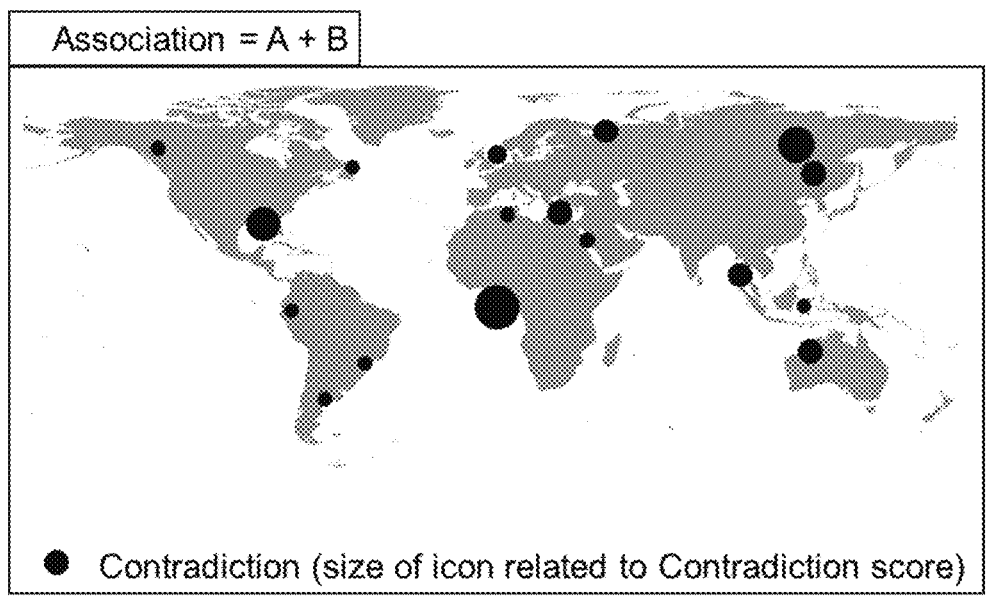

FIG. 10a Schematic showing display for contradiction scores, in accordance with a preferred embodiment by geography.

Figure 10B:
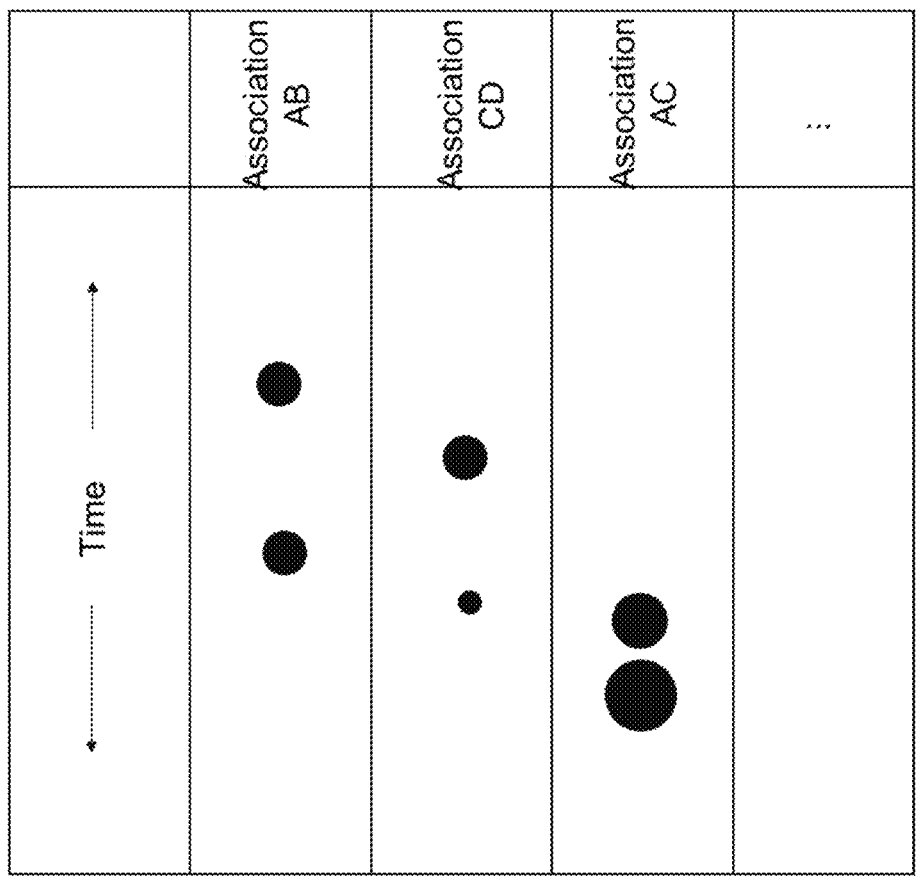

FIG. 10b Schematic showing display for contradiction scores, in accordance with a preferred embodiment by geological time.

Figure 10C:
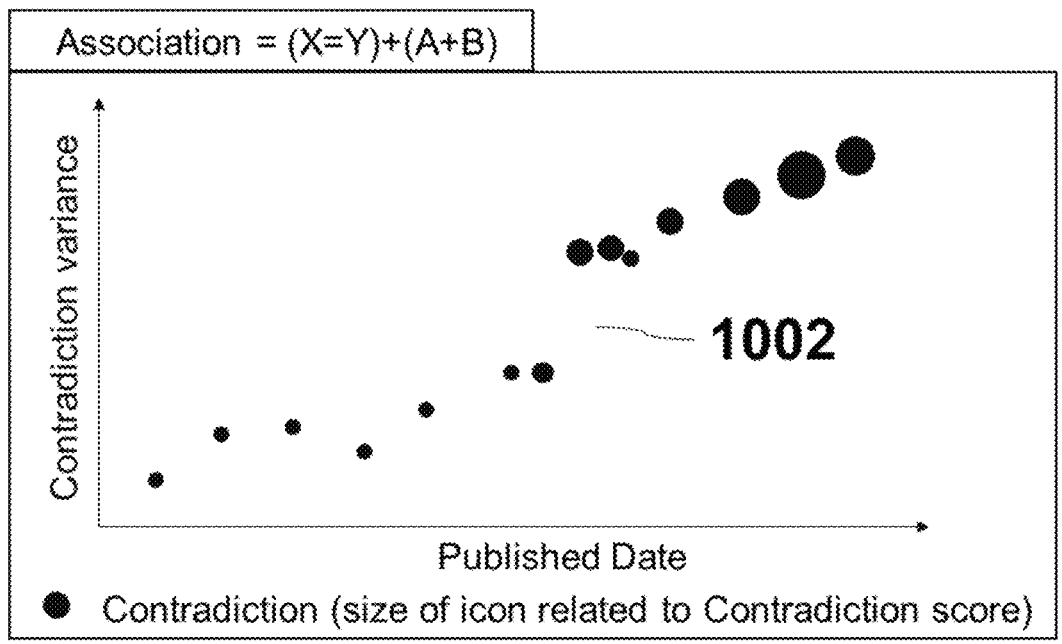

FIG. 10c—Schematic showing display for contradiction scores, in accordance with a preferred embodiment by published date of the information container.

Figure 11:
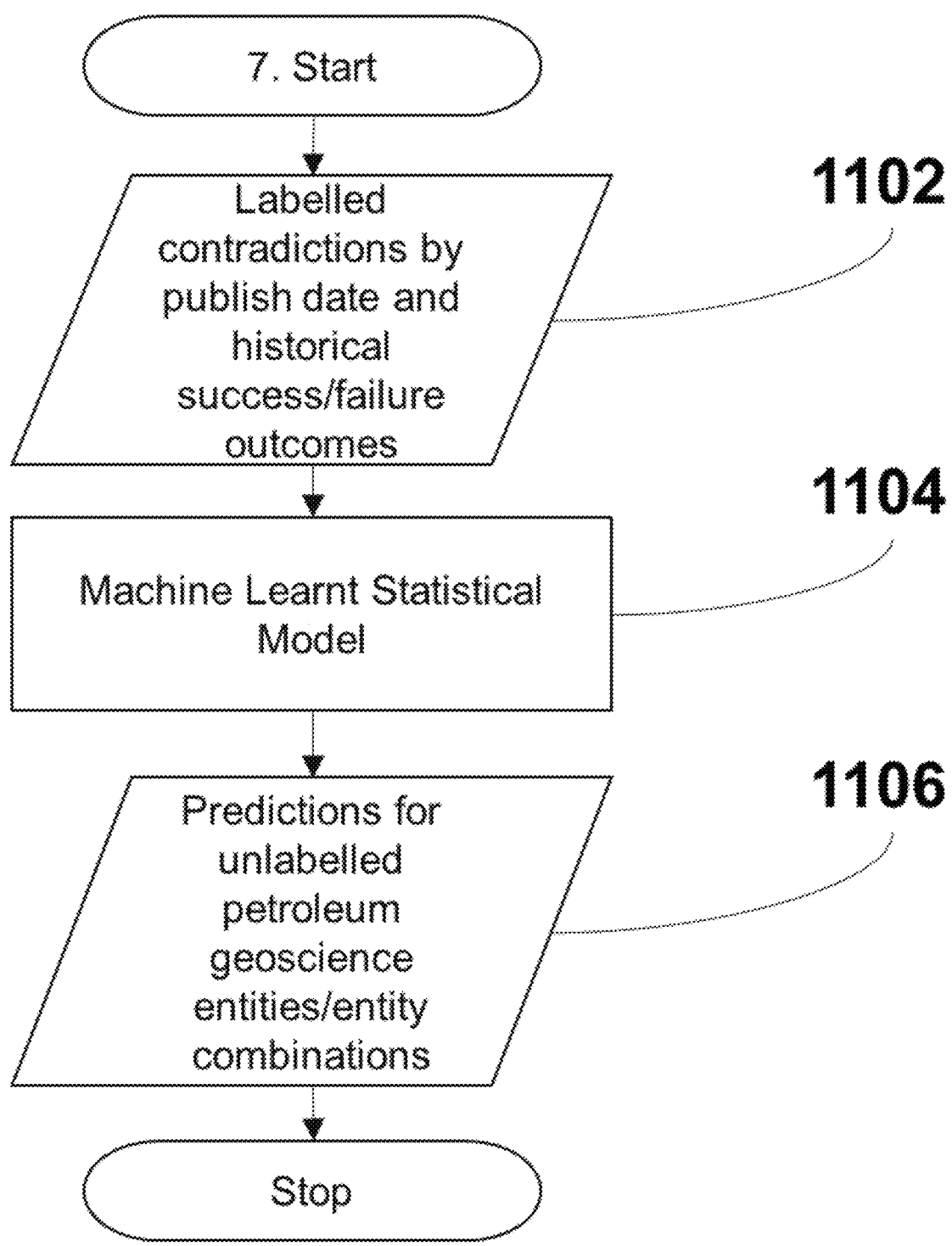

FIG. 11 Flow chart for computing a predictive classifier for likely future affordances of petroleum geoscience entities and entity combinations.

DETAILED DESCRIPTION OF THE INVENTION

The various values and configuration discussed in the following sections can be varied and are listed just to illustrate one embodiment. The invention may be embodied in several different forms and should not be taken as limited to the embodiments disclosed. The disclosed embodiments address petroleum geoscience sentiment analysis of topic associations and use of those to determine a contradiction score for sentiment in text. The disclosed embodiments are provided by way of illustration to ensure thorough disclosure and the nature of the inventions to people skilled in the art.

In this document the following definitions are used. An information container is any collection of data in computer readable form such as natural language text. This may include a collection of information, an individual document, paragraph, snippet or sentence of information. A named entity is a named noun or noun phrase explicitly mentioned in information containers that uniquely identifies something that exists, such as a person's name, company name or product name. Aspects of entity names include properties of and actions that occur on that named entity described within information containers. For example, an aspect of a specific make and model of car could include mentions of its performance and its reliability.

Topic names are defined as classifications and categorizations used in text that could apply to many things so do not uniquely identify something that exists. For example, a source rock is a categorization that could be applied to any rock if it is deemed capable of generating oil or gas.

Some petroleum geoscience entities can only be determined through associations between topics not through a named entity. For example, it is the associations of the topics 'source rock' of 'Devonian' age in a certain 'geographical area' with a shallower, younger 'reservoir' of 'Miocene' age in a certain 'geographical area', with evidence of 'migration' processes, which may describe a potential petroleum geoscience entity (such as a play). This 'play' may not exist as a named entity.

The present invention is a method and system for computing the sentiment of petroleum geoscience entities which only exist through associations between topic names in text and their resulting contradiction scores. These contradictions scores can be calibrated with real world outcomes to build a predictive classifier for future business potential and risks. The resulting petroleum geoscience sentiment of that entity, is a blend of subjective opinion and objective facts based on numerical data found within sentences.

An example of a sentence being processed by the method is shown in FIG. 1. An initial sentence 102 is processed with the detection of a named entity 'Northern Spain' 104 and the geoscience topics of 'Jurassic', 'black shales', 'reservoirs' and 'Erin Formation' 106 using such methods as (but not limited to) lexicon categories and Natural Language Processing (NLP) rule patterns. A processing filter, having a width defined by a number of tokens (that could dynamically vary on the proximity to other associations) detects topic name associations through term co-occurrence; association #1 ('Jurassic' and 'black shales') and association #2 ('reservoirs' and 'Erin Formation') 108 as input for finer grained sentiment analysis. Traditional methods focusing on the 'information container' or 'entity' do not detect this fine grained detail.

The sentence text is split into separate text windows 110 around these associations and processed by the sentiment analysis module. This assigns a sentiment classification which may be implemented using a variety of techniques such as described in Liu and Zhang (2012) such as machine learning, dictionary based, statistical and semantic. A preferred embodiment due to the sparse snippets of text and need for precise fine-grained information, is generative (rather than discriminatory) machine learning techniques such as Nave Bayes using dictionary (lexicon/thesauri) training data of rule based labelled polarity lexicons.

In the example shown, the term 'abundance' tends to have a 'positive' sentiment 112 in petroleum geoscience perspectives with 'unsorted' as most likely 'negative' 114. Sentiment classifications are stored accordingly to the association 116. At the conclusion of processing all sentences, a contradiction score is computed 118 per unique association through the variance of the aggregated sentiment classification for that association. To avoid author bias in another embodiment, sentiment from associations from the same author can be downgraded through entropy based weighting 120.

The system architecture (FIG. 2/FIG. 3) is intended as an example, not to impose any architectural limitations on other possible embodiments. FIG. 2 identifies the components comprising of non-volatile hardware storage (disk) 202 that may or may not be attached to a computer network 204, computer memory (RAM) 206, at least one computer processing unit (CPU) 208, and instruction filter 210. The transformed output may be visualized through a number of devices 214 which may or may not be connected through a computer network 212. Certain embodiments of the display include (but are not limited to), a mobile phone, tablet device, virtual reality headset, computer monitor and immersive projection devices. Embodiment may be entirely through hardware, software or a combination of both, all of which could be considered a 'circuit' or 'module'.

In FIG. 3 an example of the overall system, a user 302 interacts through an interface 304 with the transformed derived information products generated by modules 306 in a computer program 308 running on a computer operating system 310. Computer program languages could include (but are not limited to) C++, Java, Python etc.

The method operations (FIG. 4) can be sub-divided into 7 main areas. Firstly, an initial reading of a sentence from a plurality of sentences into memory and instructions to prepare the text for processing 402. Secondly, a module to detect named entities and labelled petroleum geoscience topics in the sentence 404. Thirdly, a module to determine if any associations exist between detected petroleum geoscience topics in the sentence 406. Four, a module to compute the sentiment (positive, negative and neutral) of any association(s) found in the sentence or overall information container 408. Five, a module to aggregate the sentiment classification for each unique association and compute a contradiction score based on some variance measure 410. Six, instructions to display these data to an output device 412. Seven, the combination of these contradiction scores and real world outcomes from petroleum exploration or operations, to create a predictive classifier for the affordances of petroleum geoscience entities/entity combinations. Each embodiment of these areas is described, but not limited to the following descriptions.

After reading a sentence from a plurality of sentences into memory (FIG. 5), a copy of the original text with case sensitivity is preserved 502 and a lower-case version created along with a version where common 'stop words' are removed 504. The exception for common 'stop words' are terms likely to be laden with sentiment from a petroleum geoscience perspective such as 'before', 'after', 'too'.

A lexicon/thesauri of petroleum geoscience topics can be read into computer memory 506. For example, for a 'hydrocarbon trap' topic, potential synonyms and clues may include {'faulted anticlines', 'closed structures' and 'pinchouts'}. For certain lexical categories and values (such as domain terms and acronyms) stemming may not be applied as it may lead to significant false positives 508. The tokens in the sentence can also be stemmed 510, in order that the sets of stems from the geoscience lexicons can be compared to the stems of the tokens in the sentence. If the set is disjoint 512, the next sentence is loaded into computer memory enabling faster processing. If the stems of the sentence and lexicons are not disjoint 512, operations pass to the next module (FIG. 6a) to detect the precise nature of the petroleum geoscience topics present.

FIG. 6a shows the operations to detect the specific petroleum geoscience topics that may exist in the sentence, with the topic identification module 602 utilizing lists of entities and geoscience lexicons (lookups) as well as NLP rules. Each category of lexicons in a plurality of categories can be examined to determine if lexicons from that category occur in the sentence, using stems if appropriate to that category. If the result is disjoint 604 with the stems from the input sentence, the instructions move to the next lexicon category for faster processing. If the result is not disjoint 604 the instructions move to the disambiguation module (FIG. 6b).

The disambiguation module (FIG. 6b) checks whether the matched geoscience topic needs to be disambiguated (same name but different meaning) from a prior list of candidates 606. If it has been identified as a 'class A' term 608 the lexicon term is checked against the surrounding text using a technique such as Part of Speech (POS) tagging to determine if it is a noun 610. If it is a noun, the instructions move to the next module, to identify the exact sequence position of the topic in the sentence 612 (explained in detail in FIG. 6c). If the geoscience topic is not a noun the match is skipped and the next term in the topic lexicon is checked. An example of this would be the topic 'shows'. These are signs and traces of hydrocarbons typically encountered at depths within the wellbore whilst drilling an oil and gas well. When used as a noun, it can refer to interesting potential petroleum exploration opportunities (' . . . oil shows present'). When used as a verb however, the term ('shows') has a non-relevant meaning in this context.

If the matched lexicon term is not a 'class A' term (but is still requiring of disambiguation), 614 the tokens around the matched term can be compared (using machine learning or rule based techniques) to a disambiguating set of terms (that commonly occur around uses of the topic that are not relevant to this domain). If the tokens around the matched term appear in the disambiguating set, the matched term is skipped and the next term in the topic lexicon is checked. If the tokens around the matched term are disjoint, the instructions move to the next module, to identify the exact sequence position of the topic in the sentence.

The topic position module (FIG. 6c) calculates the position of the matched topic as a sequence number in the sentence 616. If found as the first token, it would receive a position score of #1, second position #2 and so forth. This position sequence number can be added to a sorted array data structure, along with the name of the topic term and its parent category in a separate sorted array data structure. Any geoscience topics that relate to geological age or stratigraphic elements (or alternative configurations) can be treated as special cases and sequence numbering information stored in a separate array data structure 618.

The association module (FIG. 7) identifies topics matched related to Geological Time (Age) and/or Stratigraphy 702 but could be configured to any number of topics. These two types of geoscience topics provide the center point 'pin' around which a window of text is analyzed to determine if any other topics exist in proximity 704. For example, if a topic 'Jurassic' was at position #8 in the sentence, using a text window of 5, the topic 'Trap' at position #11 in the same sentence would be deemed as a topic association as it falls within the window range. An association would therefore be created and stored (Jurassic, Trap) 706. A quality of association flag can be created 708 if a topic of a different type falls between the two topics joined in an association, by absolute distance (or other technique). For example, if the topic 'Reservoir' appears at position #7, this is closer by proximity to 'Jurassic' than 'Trap', raising doubts over whether the topic 'Jurassic' actually refers to 'Trap'. A flag can be stored and added to the association when this situation occurs 710 for example, (Jurassic, Trap, Alert).

For the sentiment classification module (FIG. 8), the window text around topic associations may be processed by several modules of various forms. This may include a syntactic pivot parser 802, which may give sentiment scoring weight to text after tokens such as 'but', 'nevertheless', 'however'. These may include a negation parser 804, which may ensure for example, two negative terms following each other in word order (such as 'n' 'issue') are converted into a positive sentiment; another example is a negative term followed by a positive term, which gives weight to the negative term (such as 'not' 'good'). These may also include numerical rules 806, for example, the sentence 'the copper ore had 10,000 ppm' would be interpreted domain wise as positive sentiment as this qualifies as 'ore grade'. In these situations, the text 'good' or 'poor' can be appended to the text fragment. The numerical logic rule types and tolerance ranges could be based on common domain knowledge as well as proprietary knowledge.

This method of operations instantiated by the module, therefore blends objective 'facts' (evidence based on measured numerical data) with subjective opinions, into what is termed overall as 'petroleum geoscience sentiment' extending the method of operations beyond pure opinion detection.

Another module may include catering for word order (a preferred embodiment is using skip-grams) 808 to ensure more sophisticated sentence parsing can be undertaken. The output text windows from all of these routines may be parsed to a sentiment classifier 812. The sentiment classifier 810 may be created through a machine learnt statistical model created from examples of positive and negative sentences labelled by petroleum geoscientists. It may be a set of lexicons labelled by petroleum geoscientists. It may be a combination of these, but not limited by these embodiments.

The resulting sentiment classifications for each unique association can be parsed to the contradiction score module (FIG. 9). For every unique topic association, the number of positive and negative classifications is counted and the variance score computed 902. Consider the association of (petroleum reservoir, triassic, congo basin). If all occurrences of these associations had a positive sentiment, then the variance would be zero (no contradiction). If there is any variance 904, a potential contradiction exists which can be stored with that topic association 906.

The provenance of the association is another variable that could be used as part of the method to compute the contradiction score. For example, consider an association that had equal numbers of positive and negative sentiment (maximum variance). If all the associations with negative sentiment in that association came from the same author (low entropy), the contradiction score (variance) could be said to be less than an example where each negative (or positive) association came from a separate author and document (high entropy).

The transformed derived information product output 908 could be used by a variety of applications. Some examples are shown by geography (FIG. 10*a*) and by time (FIG. 10*b*). The contradiction scores can be stored by publish date (of its parent information container), in order to see how contradictions have increased or decreased through time (FIG. 10*c*). In the example shown, there is a kick-up point 1002 with a marked increase in contradiction about a series of petroleum entities which could mean risk is increasing, or opportunities exist for a re-interpretation of what geoscientists think exists. These could form part of such interactive displays depicted in FIG. 3 304.

The method can be taken a step further in the affordances module (FIG. 11). Petroleum geoscience sentiment contradictions (by publish date) and data on subsequent oil and gas discoveries or failures (dry holes) by date can be combined 1102. Such input data may appear as:

Area #1; Sentiment {seal, reservoir, source rock, trap etc. associations}; exploration success discovery Area #2; Sentiment {seal, reservoir, source rock, trap etc. associations}; exploration fail—breached seal Area #3; Sentiment {seal, reservoir, source rock, trap etc. associations}; exploration fail—poor reservoir Area #4; Sentiment {seal, reservoir, source rock, trap etc. associations}; exploration fail—no source These historical real world outcome data may be common domain knowledge or proprietary in nature. Through various supervised machine learning techniques 1104 including (but not limited to) Bayesian, Random Forest, SVM or Neural Networks, a classifier can be created which predicts for the unlabeled entities such as inferred plays which have yet to be explored or drilled 1106, the likelihood of an entity/combination of entities leading to a subsequent petroleum success or failure based on past contradictions and sentiment in petroleum geoscience text.

There are precedents for patents awarded to petroleum data management and data science methods (Piovesan and Kozman 2009).

The invention claimed is:

1. A computer implemented process for fine grained petroleum geoscience sentiment analysis of topic associations, the process comprising:
   receiving into a computer memory data comprising sentences of text, petroleum geoscience topic lexicons and a petroleum geoscience sentiment labelled training set;
   processing the data in the computer memory with a processor to detect petroleum geoscience topic associations;
   processing the data in the computer memory with the processor to assign sentiment values to the petroleum geoscience topic associations;
   computing contradiction scores based on the sentiment values of the petroleum geoscience topic associations; and
   outputting the petroleum geoscience topic associations, the assigned sentiment values, and the contradiction scores which are assigned to each of the respective petroleum geoscience topic associations;
   wherein the processing the data to assign the sentiment values comprises applying a filter around the detected petroleum geoscience topic associations, the filter having a width defined by a number of tokens, the filter output providing an input to a statistical sentiment classifier created from the petroleum geoscience sentiment labelled training set; and
   wherein the computing the contradiction scores comprises calculating variances in the sentiment value for each of the unique petroleum geoscience topic associations and incorporating an entropy based weighting function for a number of unique authors into the overall contradiction scores.

2. The computer-implemented process of claim 1 further comprising:
   receiving into the computer memory second data comprising a labelled training set comprising the contradiction scores derived from the sentiment values of the petroleum geoscience topic associations which have been linked to corresponding historical business success and failure, along with an unlabeled data set comprising the contradiction scores derived from the sentiment values of the petroleum geoscience topic associations which have not been linked to corresponding historical business success and failure;
   processing the second data in the computer memory using the processor to predict a likelihood of business success/failure for the petroleum geoscience topic associations in the unlabeled data set, by creating of a supervised machine learning statistical model using the labelled training set through a machine learning technique.

3. The computer-implemented process of claim 2 where in the machine learning technique is selected from a group consisting of Naïve Bayes, Random Forest, Support Vector Machines, and Neural Networks.

4. A method for conducting sentiment analysis of petroleum geoscience text, the method comprising:
   preparing a petroleum geoscience text for analysis;
   detecting named entities within the petroleum geoscience text;
   detecting one or more geoscience topics within the petroleum geoscience text;
   determining one or more associations between detected named entities, detected geoscience topics, and combinations thereof;
   determining a sentiment value for one or more of the determined associations;
   determining a contradiction score for one or more of the determined associations, wherein determining a contradiction score for the one or more of the determined associations comprises applying an entropy based weighting for unique authors;
   outputting the determined sentiment value and contradiction score.

5. The method of claim 4, wherein preparing the petroleum geoscience text for analysis comprises:
   identifying a sentence within the petroleum geoscience text for analysis;
   creating a copy of the original text of the sentence;

creating a lower case version of the sentence; and
creating stems of at least one token in the sentence.

6. The method of claim 5, further comprising removing stop words from the sentence when creating the lower case version of the sentence.

7. The method of claim 4, wherein detecting named entities within the petroleum geoscience text comprises comparing tokens in the sentence with a petroleum geoscience lexicon.

8. The method of claim 4, wherein detecting geoscience topics within the petroleum geoscience text comprises comparing tokens in the sentence with a petroleum geoscience lexicon.

9. The method of claim 4, wherein detecting geoscience topics within the petroleum geoscience text further comprises:
  comparing an identified geoscience topic against a previously identified list of disambiguation terms;
  if the identified geoscience topic is a disambiguation term, then determining if the identified geoscience topic is a noun; and
  if the identified geoscience topic is a noun determining the sequence position of the topic within the sentence.

10. The method of claim 4, wherein determining one or more associations between identified named entities, geoscience topics, and combinations thereof comprises:
  determining if the identified topic is related to a geologic time; and
  if the identified topic is related to a geologic time, then further analyzing the sentence to determine if another geoscience topic is within a text window of the sentence.

11. The method of claim 4, wherein determining a sentiment value for one or more of the determined associations comprises using a pivot parser to adjust a sentiment value for tokens having a sentence position after a pivot phrase.

12. The method of claim 4, wherein the sentiment comprises an indication of the polarity of an attitude associated with the association and a magnitude of the association.

13. The method of claim 4, wherein the sentiment is positive, negative, or neutral.

14. A system for conducting sentiment analysis of a hydrocarbon study, the system comprising:
  one or more computers having one or more processors executing computer readable instructions for a plurality of computer modules comprising:
  a text preparation module configured to prepare the sentence for analysis;
  an entity and petroleum geoscience identification module configured to detect named entities and petroleum geoscience topics in the sentence;
  an association module configured to identify one or more associations that exist between detected petroleum geoscience topics in the sentence;
  a sentiment module configured to determine a sentiment of one or more of the associations found in the sentence;
  a contradiction module configured to determine a contradiction score for the one or more associations, wherein determining a contradiction score for the one or more of the determined associations comprises applying an entropy based weighting for unique authors; and
  a display module configured to output the determined sentiment and determined contradiction score.

* * * * *